United States Patent
Han et al.

(10) Patent No.: US 7,678,348 B2
(45) Date of Patent: Mar. 16, 2010

(54) SCR CATALYTIC CONVERTER WITHOUT NH3 OR UREA INJECTION

(75) Inventors: Hyun-sik Han, Ansan (KR); Jae-ho Bae, Bucheon (KR); Eun-seok Kim, Siheung-si (KR)

(73) Assignee: Heesung Catalysts Corporation (KR)

( * ) Notice: Subject to any disclaimer, the term of this patent is extended or adjusted under 35 U.S.C. 154(b) by 88 days.

(21) Appl. No.: 11/992,845

(22) PCT Filed: Sep. 12, 2006

(86) PCT No.: PCT/KR2006/003612

§ 371 (c)(1),
(2), (4) Date: Mar. 31, 2008

(87) PCT Pub. No.: WO2007/040308

PCT Pub. Date: Apr. 12, 2007

(65) Prior Publication Data

US 2009/0255237 A1 Oct. 15, 2009

(30) Foreign Application Priority Data

Oct. 4, 2005 (KR) .................... 10-2005-0092996

(51) Int. Cl.
*B01D 50/00* (2006.01)
*F01N 3/10* (2006.01)
(52) U.S. Cl. ............... 422/180; 422/178; 422/179; 60/297; 60/299; 55/523
(58) Field of Classification Search ............. 422/180, 422/178, 177, 179; 60/297, 299, 311; 55/523
See application file for complete search history.

(56) References Cited

U.S. PATENT DOCUMENTS

| 3,963,448 | A | * | 6/1976 | Hartley et al. | 422/181 |
| 5,531,972 | A | * | 7/1996 | Rudy | 423/212 |
| 6,447,735 | B1 | * | 9/2002 | Yamanashi et al. | 422/171 |
| 6,475,453 | B1 | * | 11/2002 | Mathes et al. | 423/239.1 |
| 6,835,689 | B1 | | 12/2004 | He et al. | |
| 7,127,884 | B2 | * | 10/2006 | Worner et al. | 60/299 |
| 7,338,642 | B2 | * | 3/2008 | Nakatani et al. | 422/180 |
| 7,380,395 | B2 | * | 6/2008 | Bruck et al. | 60/286 |

(Continued)

FOREIGN PATENT DOCUMENTS

EP 1870573 * 12/2007

(Continued)

*Primary Examiner*—N. Bhat
(74) *Attorney, Agent, or Firm*—Ballard Spahr LLP

(57) ABSTRACT

A Selective Catalytic Reduction (SCR) catalytic converter that does not require the injection of a reducing agent, and, particularly, to an open-flow type or wall-flow type SCR catalytic converter that does not require the injection of a reducing agent, which includes a front portion, in which first supports supporting modified catalyst components are applied on the inner surfaces of porous partition walls, a middle portion, in which second supports supporting ammonia synthesis catalyst components are applied on the inner surfaces of porous partition walls, and a rear portion, in which third supports supporting SCR reducing catalyst components are applied on the inner surfaces of porous partition walls. The catalytic converter can improve a reduction rate of NOx without requiring the injection of an ammonia reducing agent from the outside.

8 Claims, 3 Drawing Sheets

U.S. PATENT DOCUMENTS

| | | | |
|---|---|---|---|
| 7,413,717 B2 * | 8/2008 | Hirai et al. | 422/180 |
| 7,429,285 B2 * | 9/2008 | Kuki et al. | 55/523 |
| 7,438,868 B2 * | 10/2008 | Kato | 422/180 |
| 7,503,957 B2 * | 3/2009 | Ichikawa | 55/523 |
| 7,534,738 B2 * | 5/2009 | Fujdala et al. | 502/74 |
| 2004/0166035 A1 * | 8/2004 | Noda et al. | 422/180 |

FOREIGN PATENT DOCUMENTS

| | | |
|---|---|---|
| JP | 8-144752 | 6/1996 |
| JP | 2001-020731 | 1/2001 |
| KR | 2001-0023633 A | 3/2001 |
| KR | 2004-0086532 A | 10/2004 |

* cited by examiner

[Fig. 1]
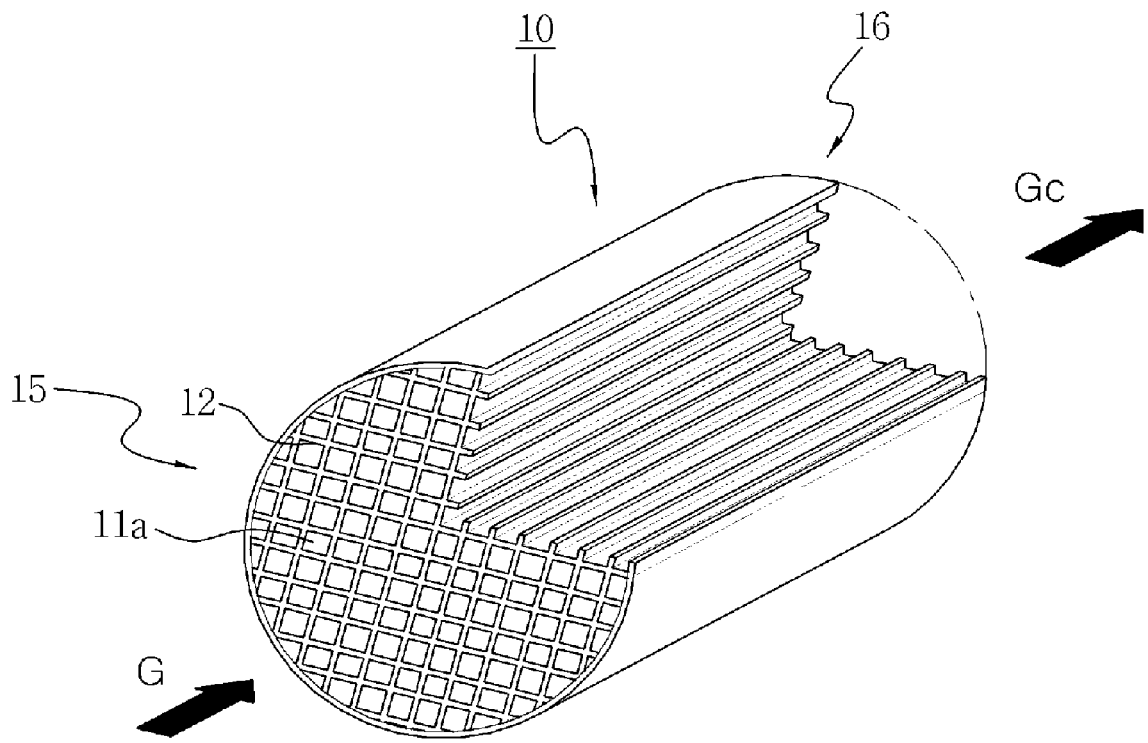
[Fig. 2]
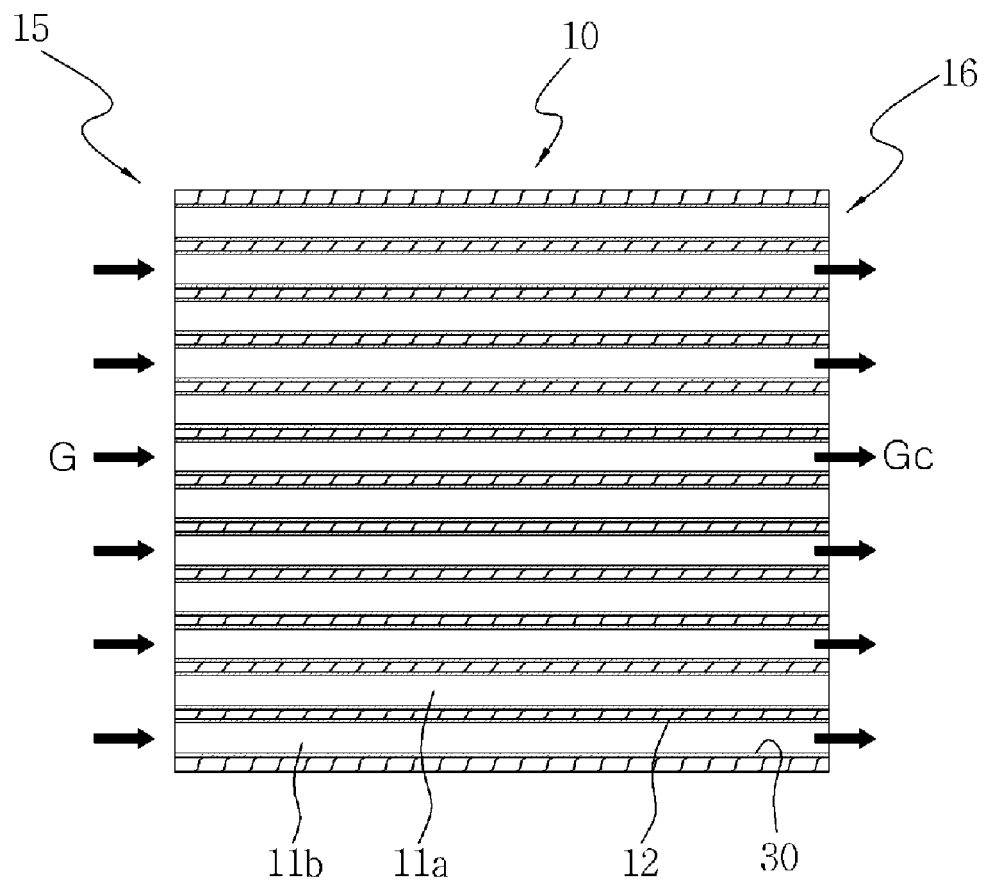

[Fig. 3]
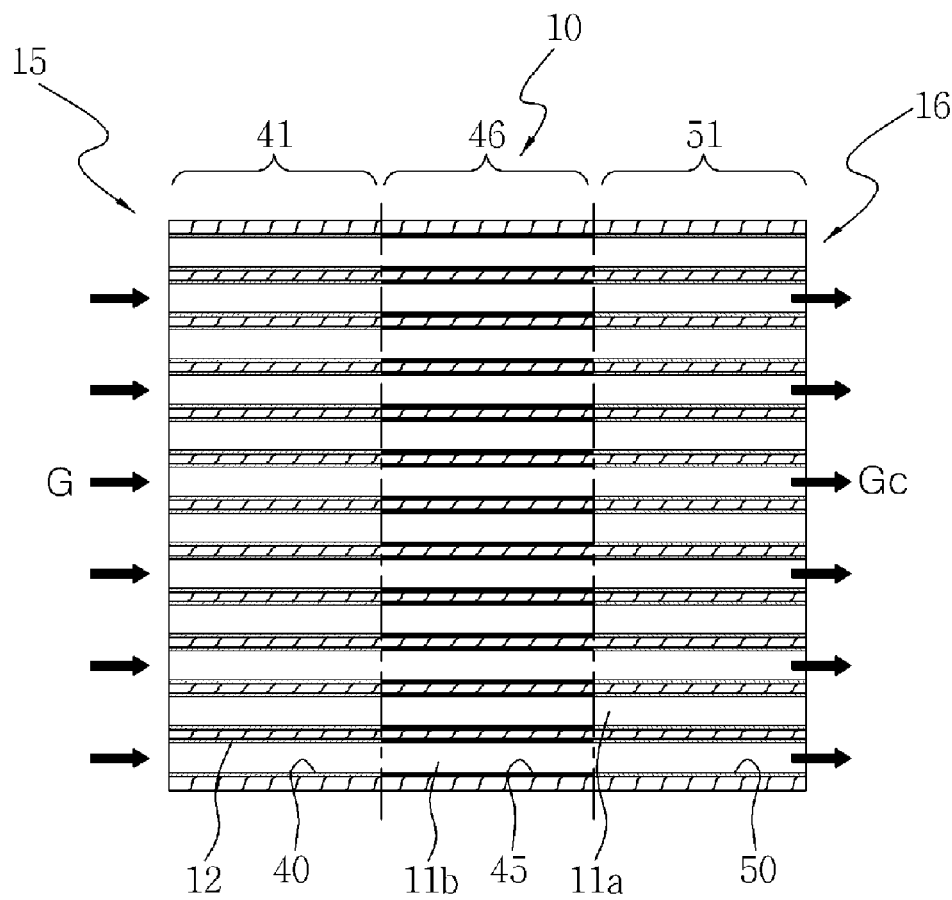
[Fig. 4]
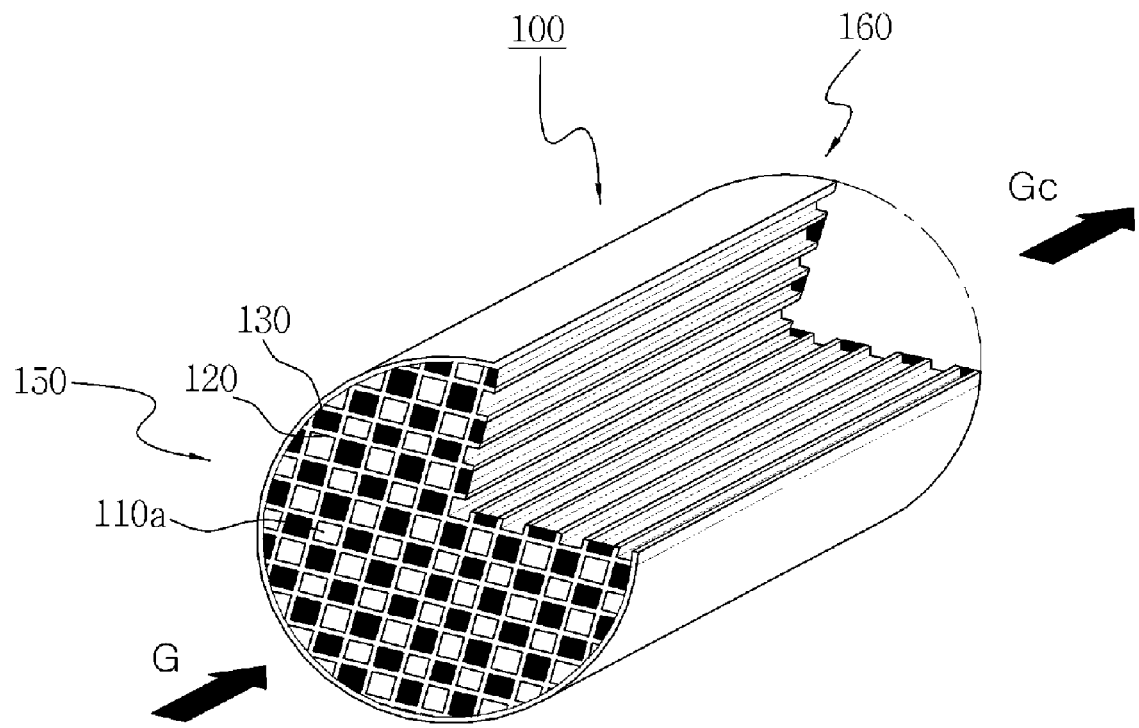

[Fig. 5]
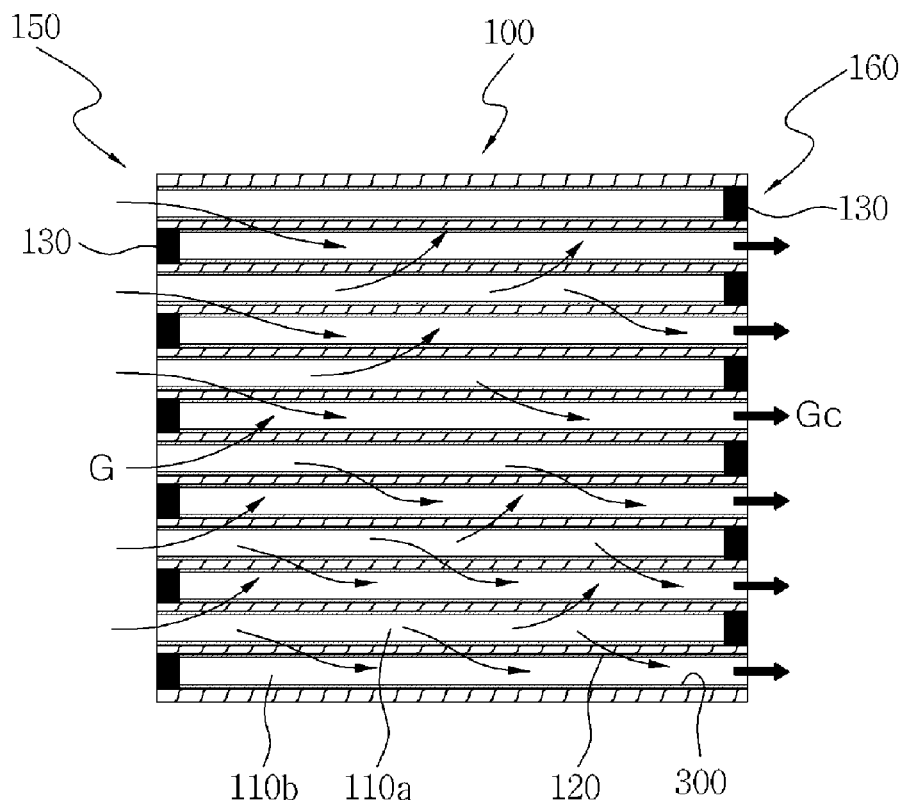
[Fig. 6]
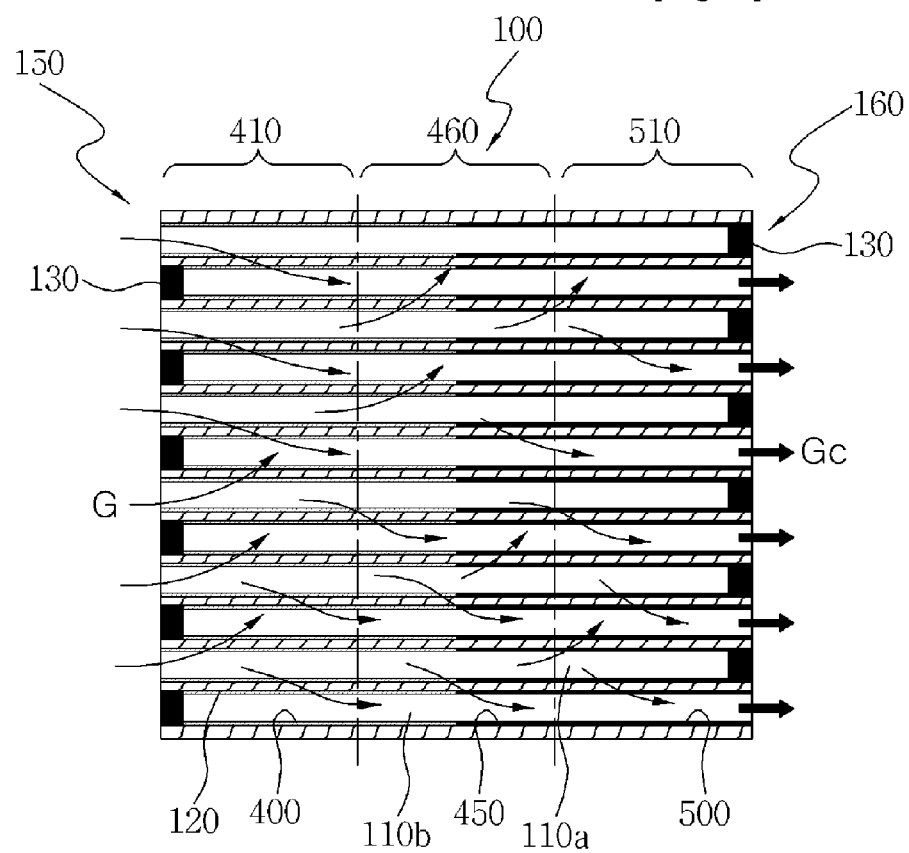

US 7,678,348 B2

SCR CATALYTIC CONVERTER WITHOUT NH3 OR UREA INJECTION

CROSS-REFERENCE TO RELATED APPLICATIONS

The present application is a National Phase Application of International Application No. PCT/KR2006/003612, filed Sep. 12, 2006, which claims priority to Republic of Korea Patent Application No. 10-2005-0092996, filed Oct. 4, 2005, which applications are incorporated herein fully by this reference.

TECHNICAL FIELD

The present invention relates to a Selective Catalytic Reduction (SCR) catalytic converter which does not require the injection of a reducing agent, and, particularly, to an open-flow type or wall-flow type SCR catalytic converter that does not require the injection of a reducing agent, including a front portion, in which first supports that support modified catalyst components are applied on the inner surfaces of porous partition walls, a middle portion, in which second supports that support ammonia synthesis catalyst components are applied on the inner surfaces of porous partition walls, and a rear portion, in which third supports that support SCR reducing catalyst components are applied on the inner surfaces of porous partition walls. More particularly, the present invention relates to a catalytic converter that can improve the reduction rate of NOx without requiring the injection of an ammonia reducing agent from the outside.

The present invention relates to a catalytic converter for removing nitrogen oxides (NOx) from the exhaust gases of internal combustion engines, particularly diesel engines, which operate in a burning condition, particularly, a lean burn condition, which requires an excess of air for stoichiometric burning. It is difficult to catalytically reduce NOx due to the presence of the excessive amount of air. The regulations for automobile exhaust gases, such as i) in the case of a light truck, FTP ('Federal Test Procedure') in the U.S.A, or MVEG ('Mobile Vehicle Emissions group') in Europe, ii) in the case of a heavy truck, HDC ('Heavy Duty Cycle') in the U.S.A, or ESC ('European Steady State Cycle') or ETC ('European Transient Cycle') in Europe, restrict the amount of specific exhaust gases, including NOx, that can be discharged during a given vehicle operation period. These regulations have gradually restricted the amount of nitrogen oxides that can be discharged during a predetermined operation period. Catalytic reduction methods for removing NOx from waste gases necessarily include the steps of converting NOx into nitrogen by passing exhaust gases through a catalyst layer in the presence of reducing gases. Generally, the present invention relates to a system using an SCR method, which is one of three methods of reducing NOx from the exhaust gases of vehicles, namely, a Non-Selective Catalytic Reduction (NSCR) method, a Selective Non-Catalytic Reduction (SNCR) method and a Selective Catalytic Reduction (SCR) method.

One reducing agent that has commonly been used in this field for a long time is ammonia. A catalyst for reducing NOx, which is effective throughout the entire operating range of a diesel engine, has been developed. Despite internal structural problems related to the use of urea, as well as latent dangers such as the leakage of ammonia or ammonia slip, using the ammonia SCR system is the only way to comply with strict NOx emission standards in a transportation field. However, despite the intrinsic advantages of the ammonia SCR system, the control system is only limitedly applicable to an automobile for structural reasons, specifically that the control system is excessively complicated and is ineffective in the control of the SCR system, in terms of the influence of the temporary emission of NOx in the SCR system, therefore efforts to develop technology providing alternatives to the ammonia SCR system have been made.

BACKGROUND ART

A conventional catalytic converter using ammonia as an external reducing agent includes a reducing catalyst or a deNOx catalyst. Generally, NOx included in exhaust gases reacts with ammonia input from the outside and is then decomposed into nitrogen and water by a zeolite supporting a vanadium component, an iron component or a copper component, or a catalyst layer formed of a mixture including titanium oxide, vanadium oxide, tungsten oxide and/or molybdenum oxide.

FIG. 1 is a partially cut-away perspective view of a catalytic converter, and FIG. 2 is a sectional view of the catalytic converter, the interior of which is coated with SCR deNOx catalyst layers. The catalytic converter 10 is formed in an open-flow type honeycomb structure, in which a plurality of exhaust gas passages 11a and 11b, which are defined by porous partition walls 12, is provided between an inlet 15 and an outlet 16. DeNOx catalysts 30 are applied on the inner surfaces of the partition walls 12 to reduce, preferably, NO to N2. FIG. 4 is a partially cut-away perspective view of a filter type catalytic converter. FIG. 5 is a sectional view of a filter type catalytic converter, the interior of which is coated with SCR deNOx catalyst layers. The catalytic converter 100 includes a plurality of exhaust gas passages 11a and 11b which is defined by porous partition walls 120. Ends of inlets 150 and outlets 160 of the catalytic converter 100 are plugged in a staggered way (see reference numeral 130). DeNOx catalysts 300 are applied on the inner surfaces of partition walls 120 to reduce, preferably, NO to N2.

However, the above described catalytic converter requires the injection of ammonia thereinto from the outside, thus entailing problems related to the installation of the catalytic converter in a vehicle. The present inventors have researched catalytic converters in an attempt to overcome these problems, and, as a result, the present invention has been completed.

DISCLOSURE OF INVENTION

Technical Problem

The present invention relates to an SCR catalytic converter that does not require the injection of a reducing agent, and that can realize the effect of purifying NOx without requiring the injection of an ammonia reducing agent or a urea reducing agent from the outside, and an object of the present invention is to provide an SCR catalytic converter that can be easily installed in a vehicle and that overcomes problems such as ammonia slip.

Technical Solution

In order to accomplish the above object, the present invention provides a catalytic converter, which is an open-flow type configured such that a plurality of exhaust gas passages 11a and 11b is defined by porous partition walls 12, including a front portion 41 in which first supports 40 supporting modified catalyst components are applied on inner surfaces of the porous partition walls, a middle portion 46 in which second supports 45 supporting ammonia synthesis catalyst components are applied on inner surfaces of the porous partition walls, and a rear portion 51 in which third supports 50 supporting SCR reducing catalyst components are applied on inner surfaces of the porous partition walls.

Further, the present invention provides a catalytic converter, which is a wall-flow type configured such that a plurality of exhaust gas passages 110a and 110b is defined by porous partition walls 120 and by plugging the ends of an inlet 150 and an outlet 160 in a staggered way, comprising a front portion 410 in which first supports 400 supporting a modified catalyst component are applied on inner surfaces of the porous partition walls, a middle portion 460, in which second supports 450 supporting ammonia synthesis catalyst components are applied on inner surfaces of the porous partition walls, and a rear portion 510, in which third supports 500 supporting SCR reducing catalyst components are applied on inner surfaces of the porous partition walls.

The modified catalyst component is a commonly known catalyst composition. Although it is not necessary to describe the particulars thereof in detail in the specification, generally, nickel (Ni) may be added to oxides such as Rh/Al2O3 and/or Rh/CeO2-ZrO2-La2O5. The ammonia synthesis catalyst component is also a commonly known catalyst composition. Although it is not described in detail in the specification, generally, Fe2O3/Al2O3 or Fe2O3/Na-Zeolite may constitute the ammonia synthesis catalyst component. Further, the SCR reducing catalyst component is a commonly known component, and, as described above, is generally formed of a zeolite supporting a vanadium component, an iron component or a copper component, or a mixture including a titanium oxide, a vanadium oxide, a tungsten oxide and/or a molybdenum oxide.

The term 'front portion' refers to a side into which exhaust gases discharged from an engine are introduced, 'rear portion' refers to a side from which exhaust gases are discharged to the outside through a catalytic converter, and 'middle portion' refers to a section between the front portion and the rear portion. The front portion, the middle portion and the rear portion do not necessarily have the same length along the axis of the catalytic converter, and the lengths thereof along the axis of the catalytic converter may vary depending on the exhaust gases and engine conditions. The catalytic converter according to the present invention may be integrally fabricated, or coated portions thereof may be individually fabricated. FIGS. 3 and 6 are schematic sectional views of catalytic converters according to the present invention.

The SCR reducing catalyst that is applied on the rear portion of the catalytic converter, includes commonly known activated components such as vanadium and/or iron, and is supported on a titanide support and/or a zeolite support. The modified catalyst that is applied on the front portion of the catalytic converter includes commonly known activated components such as rhodium etc., and these components are carried on a high surface area refractory oxide support, such as high surface area alumina, etc. The ammonia synthesis catalyst, which is applied on the middle portion of the catalytic converter, includes commonly known activated components such as iron oxides etc., and these components are carried on a high surface area refractory oxide support. The high surface area refractory oxide is a high surface area alumina material, commonly called 'gamma alumina' or 'activated alumina', and typically has a BET surface area of 60 m²/g or more. Such activated alumina is usually a mixture of the gamma and delta phases of alumina, but may also contain substantial amounts of eta, kappa and theta alumina phases. Meanwhile, methods of fabricating these catalysts, which are applied on the front, middle and rear portions of the catalytic converter, are commonly known.

The reaction equations in the present invention are as follows:

Front portion: $C_xH_yO_z \rightarrow CO+H_2$, 
Middle portion: $NO+H_2 \rightarrow NH_3$, and 
Rear portion: $NO+NH_3 \rightarrow N_2+H_2O$. 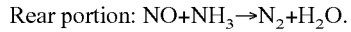

Advantageous Effects

The catalytic converter that does not require the injection of a reducing agent according to the present invention is a very useful invention that can eliminate the need for an external installation device such as an ammonia storage device or a urea storage device, overcome conventional problems such as ammonia slip, be easily installed, and provide economic efficiency.

BRIEF DESCRIPTION OF THE DRAWINGS

FIG. 1 is a partially cut-away perspective view of a first catalytic converter;

FIG. 2 is a sectional view of a conventional catalytic converter;

FIG. 3 is a sectional view of a first catalytic converter that does not require the injection of a reducing agent according to the present invention;

FIG. 4 is a partially cut-away perspective view of a second catalytic converter;

FIG. 5 is a sectional view of a conventional catalytic converter; and

FIG. 6 is a sectional view of a second catalytic converter that does not require the injection of a reducing agent according to the present invention.

DESCRIPTION OF REFERENCE NUMERALS 10, 100: catalyst converter,
11a, 11b, 110a, 110b: exhaust gas passage,
12, 120: porous partition wall,
15, 150: inlet, 16, 160: outlet,
30, 500: SCR catalyst coating layer,
40, 400: modified catalyst coating layer,
41, 410: front portion,
45, 450: ammonia synthesis catalyst coating layer,
46, 460: middle portion, 51: rear portion, 130: plugging

BEST MODE FOR CARRYING OUT THE INVENTION

In the preferred examples of the present invention, a catalytic converter, which is an open-flow type or a wall-flow type, includes a front portion which is coated with first supports 40 that support activated components including rhodium, a middle portion coated with second supports 45 that support activated components including iron, and a rear portion coated with third supports 50 that support activated components including vanadium, iron and/or copper. The first support or the second support may be selected from the group consisting of silica, alumina and titania compounds. Preferably, the first support or the second support is an activated compound selected from the group consisting of alumina, silica, silica-alumina, alumino-silicate, alumina-zirconia, alumina-chromia and alumina-ceria. More preferably, the first support or the second support is an activated alumina. The third support is an activated zeolite or titanite compound.

A catalytic converter according to the present invention will be described in detail below.

a. Activated alumina slurry 1 supporting modified catalyst components, activated alumina slurry 2 supporting ammonia synthesis catalyst components and zeolite slurry 3 supporting SCR reducing catalyst components were prepared using conventional methods, and were ball-milled so that 80% of each of the slurries 1, 2 and 3 had a particle size of 8-10□.

b. The ball-milled slurry 1 was applied on a first cordierite honeycomb, was dried at a temperature ranging from 150 to 160° C. for 10 minutes, and was then baked at a temperature ranging from 530 to 550° C. for 40 minutes.

c. The ball-milled slurry 2 was applied on the front portion of a second cordierite honeycomb, which had the same shape as the first cordierite honeycomb, except that the length of the second cordierite honeycomb was two times that of the first cordierite honeycomb in the direction of the axis of the first cordierite honeycomb, and was dried at a temperature of 150 to 160° C. for 10 minutes. Then, slurry 3 was applied on the rear portion of the honeycomb, which was not coated with the slurry 2, was dried under the same conditions, and was then baked at a temperature of ranging from 530 to 550° C. for 40 minutes, thereby preparing a second honeycomb including a front portion coated with ammonia synthesis catalyst layers and a rear portion coated with SCR reducing catalyst layers.

d. The first honeycomb was attached to the second honeycomb, thereby fabricating a catalytic converter.

In the above examples, although the process of fabricating a single catalytic converter was performed by attaching the first honeycomb to the second honeycomb, the first honeycomb and the second honeycomb may be spaced apart from each other by a predetermined interval. Further, although a second honeycomb, a front portion of which is coated with ammonia synthesis catalyst layers and a rear portion of which is coated with SCR reducing catalyst layers, is presented as an example, a third honeycomb coated with the SCR reducing catalyst layers can be used instead of this second honeycomb. Accordingly, each of the coating layers respectively applied to the honeycombs may be formed spaced apart from each other by predetermined intervals or may be contiguously formed, but the arrangement of the coating layers must be invariably respected in all cases.

Although the examples of the invention have been described in detail, the examples are merely illustrative, and the scope of the present invention is to be defined based on the accompanying claims.

The invention claimed is:

1. A SCR catalytic converter which does not require injection of a reducing agent, and which is an open-flow type configured such that a plurality of exhaust gas passages are defined by porous partition walls, comprising:
   a front portion, comprising modified catalyst components, in which first supports that support modified the catalyst components are applied on inner surfaces of the porous partition walls;
   a middle portion, comprising ammonia synthesis catalyst components, in which second supports that support the ammonia synthesis catalyst components are applied on inner surfaces of the porous partition walls; and
   a rear portion, comprising SCR reducing catalyst components, in which third supports that support the SCR reducing catalyst components are applied on inner surfaces of the porous partition walls.

2. The SCR catalytic converter as set forth in claim 1, wherein the front portion is spaced apart from the middle portion by a predetermined interval.

3. The SCR catalytic converter as set forth in claim 1, wherein the rear portion is spaced apart from the middle portion by a predetermined interval.

4. A SCR catalytic converter which does not require injection of a reducing agent, and which is a wall-flow type configured such that a plurality of exhaust gas passages are defined by porous partition walls and by ends of inlets and outlets plugged in a staggered way, comprising:
   a front portion, in which first supports supporting a modified catalyst component are applied on inner surfaces of the porous partition walls;
   a middle portion, in which second supports supporting ammonia synthesis catalyst components are applied on inner surfaces of the porous partition walls; and
   a rear portion, in which third supports supporting SCR reducing catalyst components are applied on inner surfaces of the porous partition walls.

5. The SCR catalytic converter as set forth in claim 4, wherein the front portion is spaced apart from the middle portion by a predetermined interval.

6. The SCR catalytic converter as set forth in claim 4, wherein the rear portion is spaced apart from the middle portion by a predetermined interval.

7. The SCR catalytic converter as set forth in claim 2, wherein the rear portion is spaced apart from the middle portion by a predetermined interval.

8. The SCR catalytic converter as set forth in claim 5, wherein the rear portion is spaced apart from the middle portion by a predetermined interval.

* * * * *